United States Patent [19]

Doyle

[11] Patent Number: 4,644,785

[45] Date of Patent: Feb. 24, 1987

[54] HINGED STRAIN CELL MOUNTING APPARATUS

[75] Inventor: John E. Doyle, Menlo Park, Calif.

[73] Assignee: FMC Corporation, Chicago, Ill.

[21] Appl. No.: 773,272

[22] Filed: Sep. 6, 1985

[51] Int. Cl.[4] ............................................. G01L 1/22
[52] U.S. Cl. ..................................... 73/151; 73/781; 338/6
[58] Field of Search ................. 73/151, 781, 862.65; 33/148 D, 147 D; 338/6; 73/786; 417/18, 44, 63

[56] References Cited

U.S. PATENT DOCUMENTS

| | | | |
|---|---|---|---|
| 2,085,687 | 6/1937 | Peters | 33/147 D |
| 2,151,728 | 3/1939 | Baker | 73/151 |
| 3,599,479 | 8/1971 | Kutsay | 73/781 |
| 3,729,985 | 5/1973 | Sikorra | 73/780 |
| 3,965,736 | 6/1976 | Welton et al. | 73/151 |
| 3,985,025 | 10/1976 | Osmond | 73/862.65 |
| 4,090,405 | 5/1978 | McKee | 73/151 |

FOREIGN PATENT DOCUMENTS 0637698 12/1978 U.S.S.R. ............................. 73/781

Primary Examiner—Stephen A. Kreitman
Assistant Examiner—Scott M. Oldham
Attorney, Agent, or Firm—Lloyd B. Guernsey; H. M. Stanley; R. B. Megley

[57] ABSTRACT

Apparatus for removably connecting a strain cell to a polished rod of a well pumping unit and for preventing the development of strain cell output signals due to bending of the polished rod. The strain cell is connected to a frame member which can be clamped to the polished rod where strain cell output signals are obtained due to a change in tensile load on the rod. A pair of hinges, between the frame member and the polished rod, minimizes the development of strain cell output signals due to bending of the polished rod. The frame member can be adapted to mount on a variety of sizes of polished rods. The apparatus can be removed or replaced without the use of special skills or special equipment.

11 Claims, 15 Drawing Figures

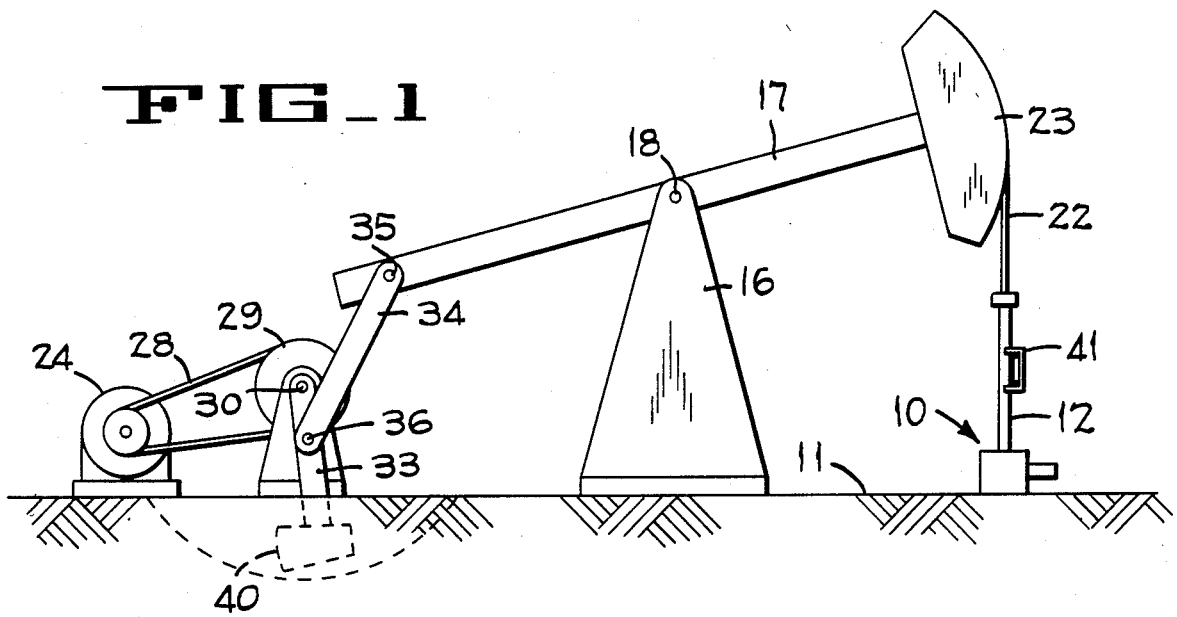
FIG_1
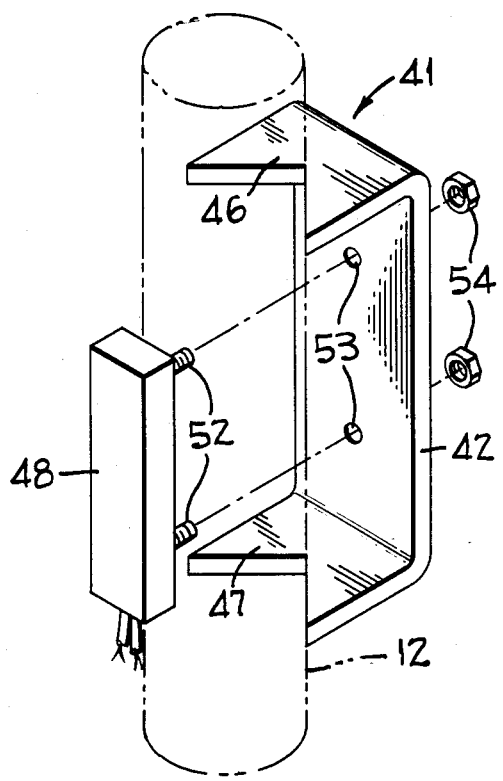
FIG_2
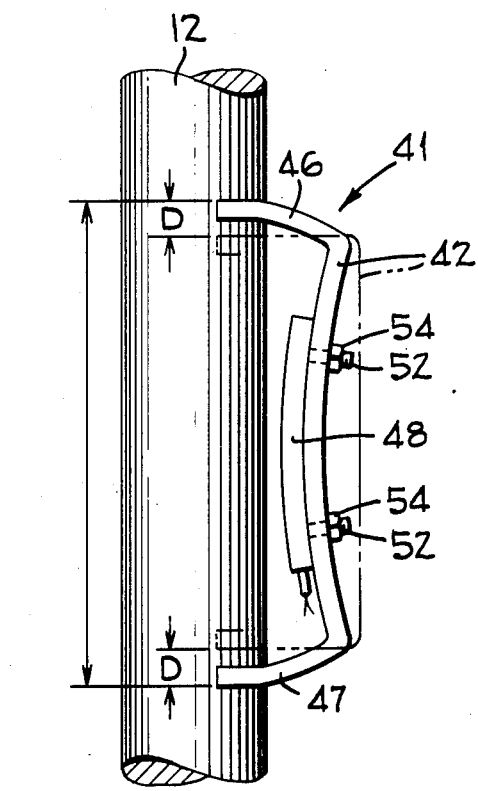
FIG_3

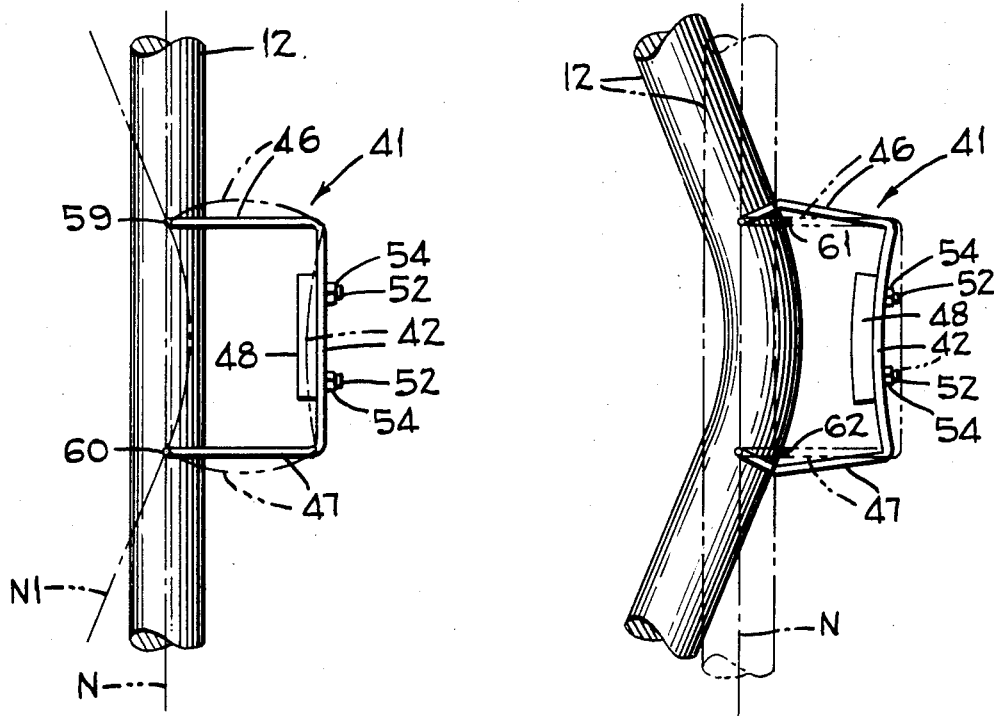
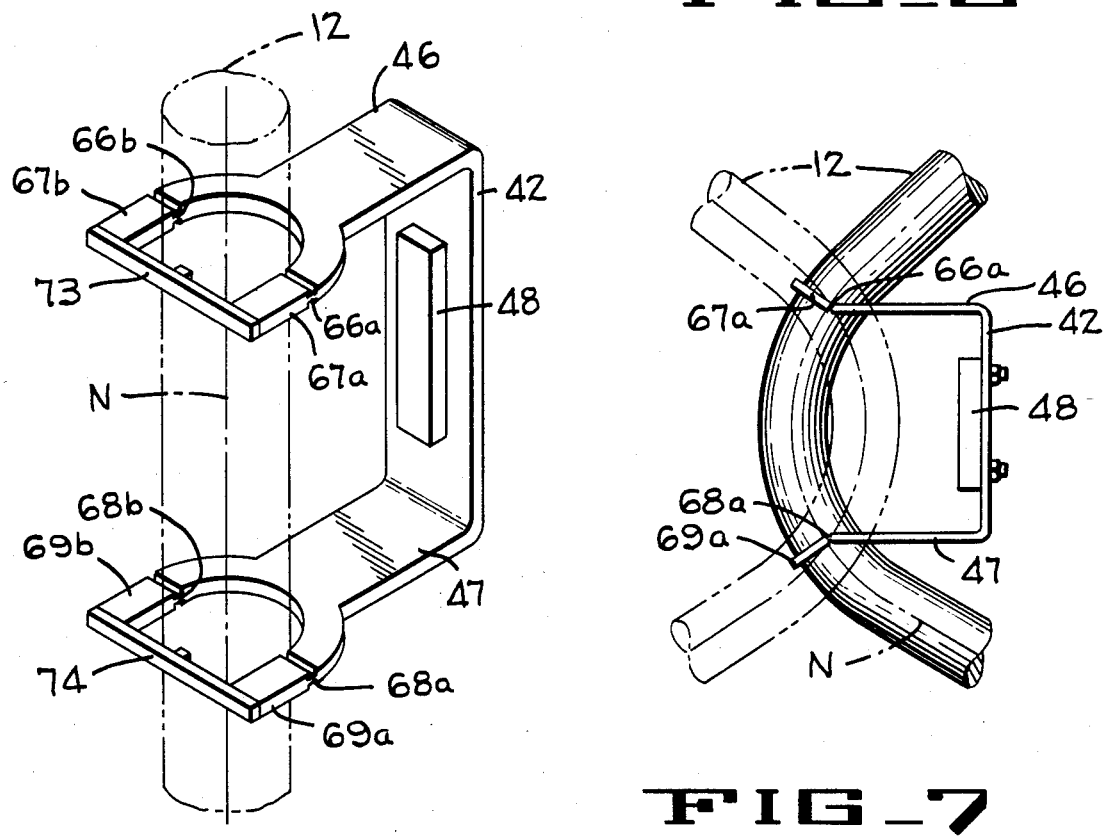

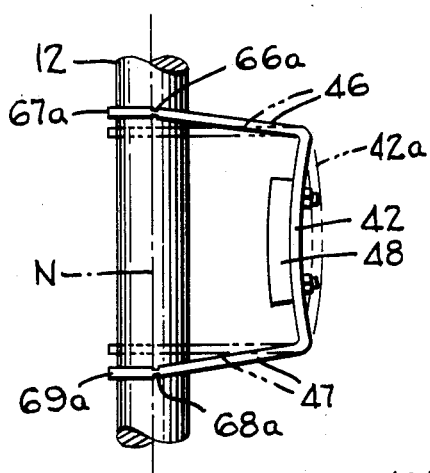
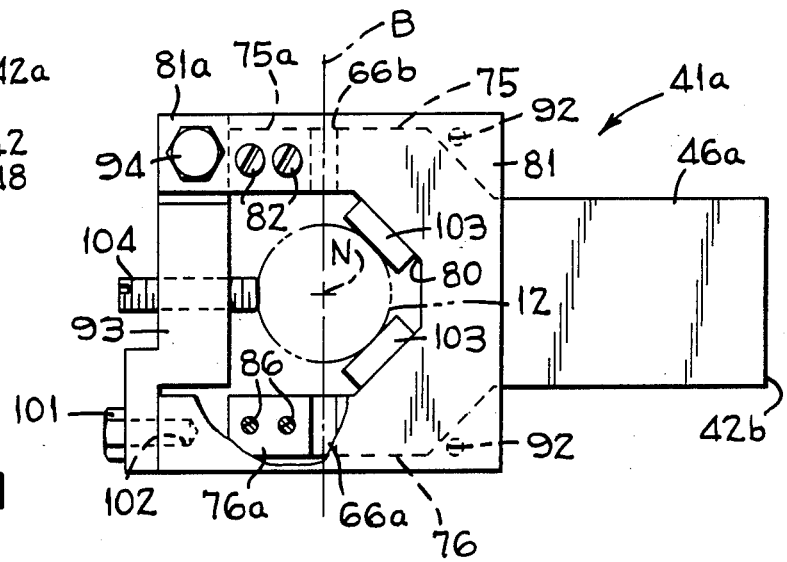
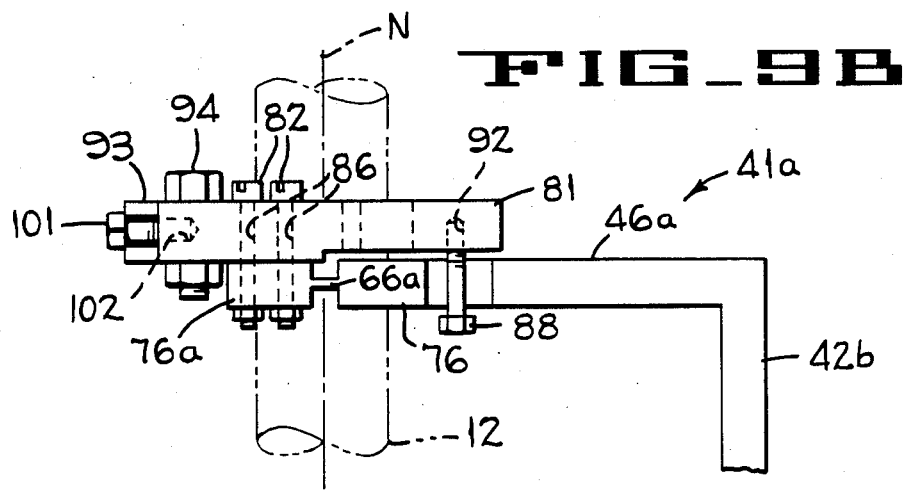
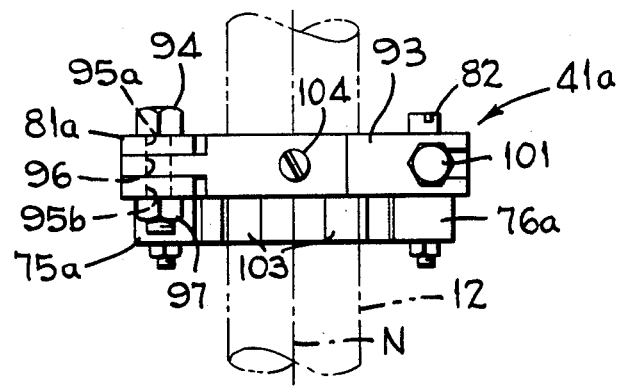

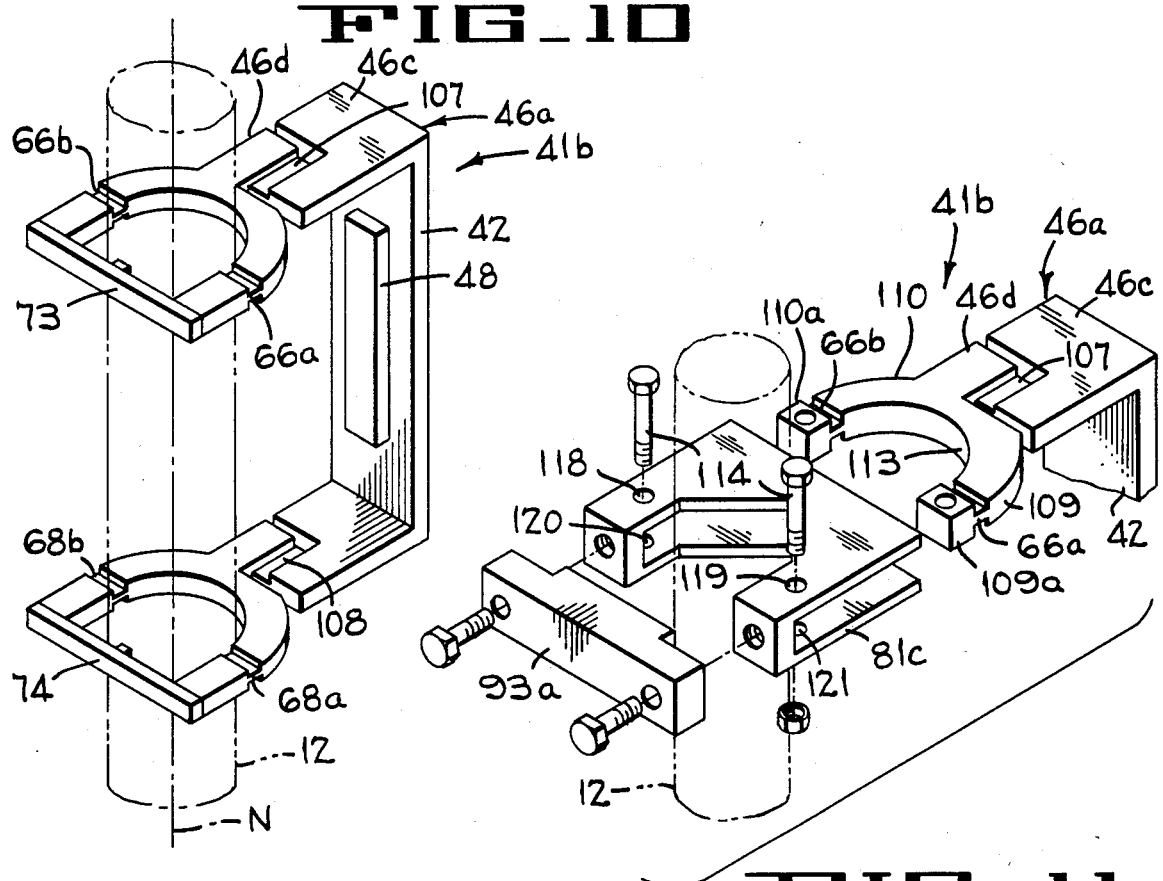
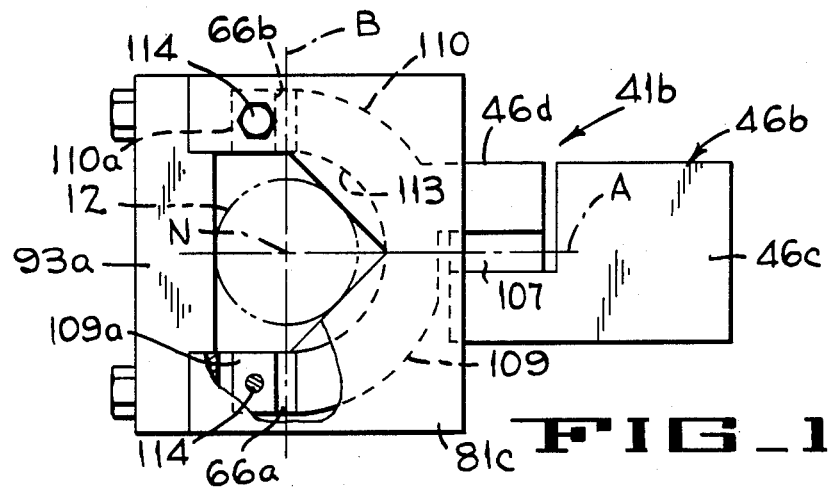
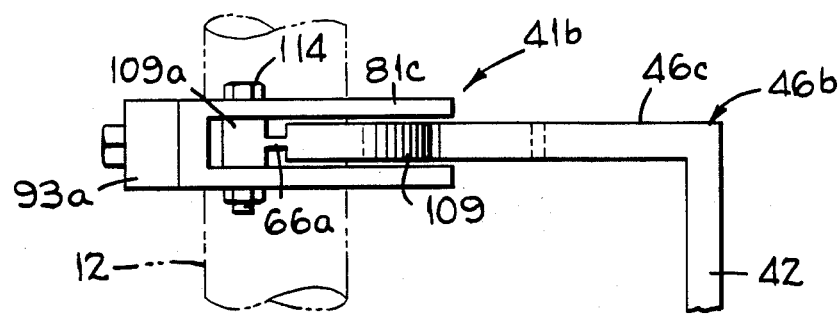

HINGED STRAIN CELL MOUNTING APPARATUS

BACKGROUND OF THE INVENTION

The present invention relates to apparatus for removably connecting a strain measuring device to a polished rod of a well pumping unit, and more particularly, to removable apparatus which measures axial strain in a variety of sizes of polished rods irrespective of any bending in the polished rod.

Sucker-rod type pumping units are widely used in the petroleum industry in order to recover fluid from wells extending into subterranean formations. Such units include a sucker-rod string which extends into the well and means at the surface for an up and down movement of the rod string in order to operate a downhole pump. Typical of such units are the so called "beam-type" pumping units having the sucker-rod string suspended at the surface of the well consisting of a Samson post and a walking beam pivotally connected on the Samson post. The sucker-rod string is normally connected to one end of the walking beam by a polished rod and the other end of the walking beam is connected to a prime mover such as a motor through a suitable crank and pitman connection. In this arrangement the walking beam, polished rod and sucker-rod string are driven in a reciprocable mode by the prime mover.

A variety of malfunctions such as worn pumps, broken sucker-rods, split tubing, and stuck pump valves can interrupt the pumping of fluid from a well. Such malfunctions can be caused by normal wear and tear on the equipment, by the nature of the fluid being pumped or they could be caused by abnormal pumping conditions.

A load cell can be connected between the polished rod and the walking beam to measure the axial strain or load on the polished rod. The change in axial strain on the polished rod can be used to detect and analyze the presence of abnormal pumping conditions. However, placing a load cell between the polished rod and the walking beam of each well is not only expensive, but changing such a load cell is expensive, time consuming and there is a risk of dropping a disconnected sucker-rod string into the well.

SUMMARY OF THE INVENTION

The present invention provides new and improved apparatus for removably connecting a strain cell for measuring the axial strain in a polished rod of a well pumping unit having a sucker-rod string. The strain cell is connected to a frame member which can be clamped to a polished rod where strain readings can be obtained with the pumping unit in operation. The strain cell and frame member can then be removed from the polished rod and moved to another well pumping unit where the process can be repeated.

The frame member includes a gage beam and a pair of gage arms with one gage arm extending from each end of the gage beam. A first clamp is secured about a portion of the polished rod and a first hinge is connected between a first gage arm and the first clamp with the first hinge aligned at right angles to a neutral axis of the polished rod. A second clamp is secured to a lower portion of the polished rod and a second hinge is connected between a second gage arm and the second clamp with the second hinge aligned at right angles to the neutral axis of the polished rod. A change in length of the polished rod due to a change in axial strain (due to a change in load) causes a bending of the gage beam and causes the strain cell connected to the gage beam to produce an output signal. Cyclic bending of the polished rod can occur due to physical damage or misalignment of pumping mechanism at the wellhead. If the frame member were connected directly to the polished rod, a bending of the polished rod could cause a bending of the gage beam and produce a signal which falsely indicates a change in length of the polished rod. The use of hinges in the mounting apparatus alleviates the generation of the false output signal. The hinges are aligned at right angles to the neutral axis of the polished rod to minimize any bending of the gage beam due to bending of the polished rod and thus minimizes the generation of an output signal in the strain gage.

BRIEF DESCRIPTION OF THE DRAWINGS

FIG. 1 is a diagrammatic illustration of a well equipped with a sucker-rod type pumping unit which uses a hinged clamp-on strain cell of the present invention.

FIG. 2 illustrates a simple frame member which can be clamped to a polished rod of a pumping unit.

FIGS. 3-5 illustrate operation of the frame member when connected to the polished rod.

FIG. 6 illustrates a hinged clamp-on frame member of the present invention.

FIGS. 7 and 8 illustrate operation of the hinged clamp-on frame member of FIG. 6.

FIGS. 9A-9C disclose a hinged clamp-on strain cell of the present invention which is adapted for mounting on a wide range of sizes of polished rods.

FIG. 10 is an isometric drawing of a strain-cell mounting apparatus having a first pair of hinges which bend in a first direction and another hinge which bends at an angle of 90 degrees relative to the first pair of hinges.

FIG. 11 is an isometric drawing of a strain-cell mounting apparatus of the present invention having a first pair of hinges which bend in a first direction, another hinge which bends at right angles to the first pair and is adapted for mounting on a wide range of sizes of polished rods.

FIG. 12 is a top view of the strain-cell mounting apparatus of FIG. 10.

FIG. 13 is a side view of the strain-cell mounting apparatus of FIG. 10.

DESCRIPTION OF THE PREFERRED EMBODIMENT

Referring to FIG. 1, there is illustrated a wellhead 10 of a well which extends from the earth's surface 11 into a subsurface well producing formation (not shown). The wellhead comprises a polished rod 12 suspended in the well from a support unit consisting of a support post 16 and a walking beam 17 which is pivotally mounted on the support post by a pin connection 18. The polished rod 12 is connected to the walking beam 17 by a cable section 22 and a horsehead 23.

The walking beam 17 is reciprocated by a prime mover such as an electric motor 24. The prime mover drives the walking beam through a drive system which includes a drive belt 28, crank 29, crank shaft 30, crank arm 33, and a pitman 34 which is pivotally connected between the crank arm and the walking beam by means of pin connections 35, 36. The outer end of the crank arm 33 is provided with a counterweight 40 which balances a portion of the load on the polished rod in order to provide a more constant load on the prime mover.

A strain cell mounting apparatus 41 (FIG. 1) is removably connected to the polished rod 12 and the apparatus can be removed or replaced without any special skills and without the use of any special tools. A single strain cell can be easily moved from one polished rod to another and the apparatus is adapted to fit a wide variety of diameters of polished rods. The mounting apparatus 41 includes a gage beam 42 (FIG. 2) and a pair of gage arms 46, 47 mounted substantially at right angles to the ends of the gage beam 42. A strain cell 48 is connected to the gage beam 42 by a pair of bolts 52 extending through a pair of holes 53 in the gage beam and secured in position by a pair of nuts 54. Each of the gage arms 46, 47 includes a "V" shaped notch at the end so the gage arms can be clamped to various sizes of polished rods with the rod resting in the notches. A strain cell 48 which can be used with the present invention is the model 505 built by Kistler-Morse Corporation of Bellevue, Wash.

When the rod 12 (FIG. 3) is stretched, due to an increase in load, the output ends of gage arms 46, 47 are moved further apart with each arm moving an amount, such as the distance D. This movement of gage arms 46, 47 causes a bending of the gage beam 42 from the dotted line position shown to the solid line position. The bending of the gage beam 42 causes a stretching of the strain cell 48 (FIG. 3) causing the strain cell to develop an output signal which is proportional to the increase in length of the strain cell 48. A false signal can develop due to a bending of the polished rod which occurs in normal operation of the well. This bending of the polished rod can result in an output signal from a clamped-on strain cell 48 (FIG. 2) even though the axial strain (load) on the polished rod has not changed. For example in FIG. 4 the outer ends of gage arms 46, 47 are shown as making contact with the polished rod 12 at a pair of points 59, 60 which are in line with a neutral axis N with the arms 46, 47 at right angles to axis N. As the rod 12 bends the outer ends of the gage arms remain clamped at right angles to the bent neutral axis N1 causing a bending of gage arms 46, 47 into the dotted line positions and bending the gage 42 into the dotted line position. When the gage beam 42 bends, the attached strain cell 48 provides an output signal even though the length of the polished rod 12 has not changed. The amount of bending of the polished rod 12 has been greatly exaggerated in the FIGS. 4, 5 and 7 in order to illustrate how false signals can be developed in the strain cell.

When the outer ends of the gage arms 46, 47 make contact with the polished rod 12 at points which are not in line with the neutral axis N the strain gage 48 also provides an output signal due to bending of the rod with no change in length of the rod. For example, in FIG. 5 the outer ends of gage arms 46, 47 are shown as making contact with the polished rod 12 at a pair of points 61, 62 which are not in line with the neutral axis N. As the rod 12 bends the length of the neutral axis remains the same but the point 61 moves upward and point 62 moves downward causing the gage arms 46, 47 to bend into the dotted line positions and causing the gage beam 42 to bend into the dotted line position. When the gage beam 42 bends, the attached strain cell 48 again provides an output signal even though the length of the polished rod 12 has not changed.

Apparatus for eliminating the generation of strain cell output signals due to bending of the polished rod 12 is disclosed in FIG. 6. A pair of hinges 66a, 66b are connected between the gage arm 46 and a pair of arms 67a, 67b with the hinges aligned at right angles to the neutral axis N of the polished rod 12. Another pair of hinges 68a, 68b are connected between the gage arm 47 and a pair of arms 69a, 69b with the hinges also aligned at right angles to the neutral axis N of the polished rod 12. The arms 67a, 67b (FIGS. 6, 7) are secured to the rod 12 by a clamp arm 73 and the arms 69a, 69b are secured to another axially spaced portion of the rod 12 by a clamp arm 74. When the rod 12 bends (FIG. 7), with no change in rod length, arms 67a, 67b and 69a, 69b remain substantially perpendicular to the neutral axis N of rod 12, but gage arm 46 remains parallel to gage arm 47 due to bending of the hinges 66a, 66b, 68a, 68b.

When the polished rod 12 is stretched (FIGS. 6, 8) the hinges 66a, 66b, at the outer end of the gage arm 46, are moved further from the hinges 68a, 68b, at the outer end of the gage arm 47 (from the dotted line position to the solid line position of FIG. 8), causing the gage beam 42 to bend inward toward the rod 12. The inward bending of gage arm 42 causes the strain gage 48 to increase in length and to provide an output signal having a first polarity. The value of the output signal from strain gage 48 is proportional to the increase in length of the polished rod 12. A compression of the polished rod 12 causes the hinges 66a, 66b and the outer end of the gage arm 46 to move closer to the hinges 68a, 68b at the outer end of the gage arm 42 and causes the gage beam 42 to bend outward from rod 12 to the position shown by the phantom line 42a. The outward bending of the gage arm 42 compresses the strain cell 48 causing the strain cell to provide an output signal having a second polarity. The value of the output signal from strain 48 is proportional to the decrease in length of the polished rod 12.

Details of an improved hinged stain-cell mounting apparatus 41a which is adapted to fit a variety of sizes of polished rods are disclosed in FIGS. 9A-9C where FIG. 9A is a top view, FIG. 9B is a side view and FIG. 9C is an end view of the mounting apparatus. The apparatus 41a includes a gage beam 42b having an upper gage arm 46a welded or otherwise connected to the upper end of beam 42b and a similar lower gage arm (not shown) connected to the lower end of beam 42b. An outer portion of the gage arm 46a includes a pair of fingers 75, 76 separated by a generally U-shaped slot 80. An outer end portion 75a, 76a of each of the fingers is connected to the fingers 75, 76 by a hinge 66a, 66b. The outer end portions 75a, 75b are connected to a generally U-shaped clamp body 81 by a plurality of bolts 82 mounted in a plurality of holes 86.

A pair of capscrews 88 (FIGS. 9A-9C) mounted through a pair of holes 92 and secured to the clamp body 81 limit the amount of bending of hinges 66a, 66b and limit the amount of deflection of clamp body 81 relative to gage arm 46a. One end of a clamp arm 93 is pivotally secured to an outer end 81a of the clamp body 81 by a pin 94 secured in a plurality of holes 95a, 95b, 96 by a nut 97. The clamp arm 93 can be pivoted outwardly from an outer end 81a of the clamp body into an open position so the clamp body 81 and the gage fingers 75, 76 can be positioned about the polished rod 12 as shown in FIG. 9A. The clamp arm 93 is then pivoted into the secured position (FIG. 9A) and securely fastened to the clamp body 81 by a capscrew 101 which extends into a threaded bore 102 in the clamp body 81.

A pair of clamp adaptors 103 and an adjustable screw 104 are used to secure the clamp body 81 to the polished rod 12. Several different sizes of clamp adaptors 103 can be made available and the proper thickness of adaptors selected so the hinges 66a, 66b are aligned along an axis B which is at right angles to the neutral axis N of the polished rod 12 (FIG. 9) when the adjustment screw 104 is tightened against the rod 12.

When the polished rod 12 bends in the direction shown by the solid lines in FIG. 7 or in the direction shown by the dotted lines in FIG. 7, the hinges 66a, 66b, 68a, 68b bend and prevent any change in length of the strain cell 48 as described above. However, the polished rod 12 may also bend in other directions, such as at right angles to the plane of the hinges. The large dimension of the gage beam 42 (FIGS. 2, 6) prevents bending of the gage beam in a direction at right angles to the hinges 66a, 66b, 68a, 68b but this lack of bending of the gage beam places a strain on the hinges and on the clamp arms 73, 74 (FIG. 6). A pair of hinges 107, 108 (FIG. 10) adapted to bend at right angles to the direction of bending of hinges 66a, 66b, 68a, 68b relieve the strain on these hinges and on the clamp arms 73, 74.

Details of an improved hinged strain-cell mounting apparatus 41b, having one set of hinges that bend in a first direction and another set of hinges that bend at right angles to the first direction are shown in FIGS. 10-13. The upper gage arm 46b includes an inner portion 46c and an outer portion 46d interconnected by a hinge 107. The hinge 107 bends along an axis A which is at right angles to the neutral axis N of the polished rod 12. The axis A of hinge 107 is also at right angles to an axis B of the hinges 66a, 66b. An outer portion of the gage arm 46d includes a pair of fingers 109, 110 separated by a generally U-shaped slot 113. An outer end portion 109a 110a of each of the fingers is connected to the fingers 109, 110 by one of the hinges 66a, 66b. The outer end portions 109a, 110a are connected to a dual U-shaped clamp body 81c by a pair of bolts 114 mounted in a plurality of holes 118-121. The end portions 109a, 110a are somewhat thicker than the fingers 109, 110 which allows clamp body 81c to pivot relative to fingers 109, 110 (FIG. 13), but limits the amount of pivotal movement about the hinges 66a, 66b. A clamp arm 93a is bolted or otherwise secured to the clamp body 81c to clamp the apparatus 41b to the polished rod 12.

The apparatus of the present invention can be removably attached to a variety of sizes of polished rods without the use of special tools or special skills. Hinges between the strain cell and the polished rod prevent the generation of strain cell output signals due to bending of the polished rod.

Although the best mode contemplated for carrying out the present invention has been herein shown and described, it will be apparent that modification and variation may be made without departing from what is regarded to be the subject matter of the invention.

What is claimed is:

1. Apparatus for removably connecting a strain cell for measuring the axial strain in a polished rod of a well pumping unit having a sucker-rod string and a power unit to reciprocate said rod string to produce fluid from an underground location, said apparatus comprising:
   a frame member having a gage beam and a pair of gage arms with each gage arm being connected to a corresponding end of said gage beam;
   a pair of clamps for securing said gage arms to axially spaced portions of said polished rod;
   a first pair of flexible hinges, each of said first hinges being connected between a first one of said clamps and a first one of said gage arms with said first hinges being mounted with a bending axis of each of said first hinges substantially at right angles to a neutral axis of said polished rod;
   a second pair of flexible hinges, each of said second hinges being connected between a second one of said clamps and a second one of said gage arms with said second hinges being mounted with a bending axis of each of said second hinges substantially at right angles to said neutral axis of said polished rod;
   a third pair of flexible hinges, each of said third hinges being mounted between a portion of one of said gage arms and a corresponding one of said first and said second pairs of hinges with a bending axis of a first of said third hinges extending at right angles through said bending axis of said first pair of hinges, a bending axis of a second of said third hinges extending at right angles through said bending axis of said second pair of hinges; and
   means for securing said strain cell to said gage beam of said frame member.

2. Apparatus as defined in claim 1 wherein a change in length of said polished rod causes a bending of said gage beam and produces an output signal from said strain cell.

3. Apparatus as defined in claim 1 wherein said hinges are positioned to cause said strain cell to accurately measure any change in axial strain in said polished rod irrespective of any bending of said polished rod.

4. Apparatus as defined in claim 1 wherein an axis of each of said first, said second and said third hinges is substantially at right angles to said neutral axis of said polished rod to cause said strain cell to accurately measure axial strain in said polished rod irrespective of any bending of said polished rod.

5. Apparatus as defined in claim 1 wherein said gage beam lies in a plane substantially parallel to a plane through said neutral axis and wherein said gage arms each lie in a plane substantially at right angles to said plane of said neutral axis causing said gage beam to bend with a change in length of said polished rod, said bending of said gage beam causing said strain cell to delvelop an output signal.

6. Apparatus as defined in claim 1 wherein said bending axis of said first pair of flexible hinges is substantially parallel to said bending axis of said second pair of flexible hinges.

7. Apparatus as defined in claim 1 wherein said bending axis of each of said third pair of hinges is substantially at right angles to said neutral axis of said polished rod.

8. Apparatus as defined in claim 1 wherein said axis of bending of each of said first, said second and said third hinges is at right angles to said neutral axis of said polished rod and each of said first, said second and said third axes of bending intersects said neutral axis of said polished rod.

9. Apparatus for removably connecting a strain cell for measuring the axial strain in a polished rod of a well pumping unit having a power unit to reciprocate said polished rod, said strain cell being connected for accurately measuring the axial strain in the polished rod irrespective of bending of said polished rod, said apparatus comprising:
- a frame member having a gage beam and a pair of gage arms;
- a pair of clamping means for securing said gage arms to axially spaced portions of said polished rod;
- a first pair of flexible hinges, each of said first hinges being connected between a first one of said clamping means and a first one of said gage arms, with a bending axis of each of said first pair of hinges being substantially at right angles to a neutral axis of said polished rod;
- a second pair of flexible hinges, each of said second hinges being connected between a second one of said clamping means and a second one of said gage arms with said second hinges, with a bending axis of each of said second pair of hinges being substantially at right angles to said neutral axis of said polished rod;
- a third pair of flexible hinges, each of said third hinges being mounted between a portion of one of said gage arms and a corresponding one of said first and said second pairs of hinges with a bending axis of a first of said third hinges extending at right angles through said bending axis of said first pair of hinges, a bending axis of a second of said third hinges extending at right angles through said bending axis of said second pair of hinges; and
- means for connecting said strain cell to said gage beam of said frame member.

10. Apparatus as defined in claim 9 including means for adapting said clamping means to fit a variety of rod diameters while positioning said first and said second pairs of hinges at right angles to said neutral axis of said polished rod.

11. Apparatus as defined in claim 9 including means for adapting said clamping means to fit a variety of rod diameters while positioning said first pair of said second pair and said third pair of hinges at right angles to said neutral axis of said polished rod.

* * * * *